(12) United States Patent
Yuan et al.

(10) Patent No.: US 12,373,150 B2
(45) Date of Patent: Jul. 29, 2025

(54) SECURE PRINTING IN A VIRTUALIZED COMPUTING ENVIRONMENT

(71) Applicant: Omnissa, LLC, Mountain View, CA (US)

(72) Inventors: Hui Yuan, Beijing (CN); Kun Shi, Beijing (CN); Zhiyu Li, Beijing (CN); Hui Zhang, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 112 days.

(21) Appl. No.: 18/381,154

(22) Filed: Oct. 17, 2023

(65) Prior Publication Data
US 2025/0103261 A1  Mar. 27, 2025

(30) Foreign Application Priority Data

Sep. 21, 2023 (WO) ................ PCT/CN2023/120410

(51) Int. Cl.
*H04N 1/04* (2006.01)
*G06F 3/12* (2006.01)

(52) U.S. Cl.
CPC .......... *G06F 3/1297* (2013.01); *G06F 3/1222* (2013.01); *G06F 3/1238* (2013.01)

(58) Field of Classification Search
None
See application file for complete search history.

(56) References Cited

U.S. PATENT DOCUMENTS

2016/0239244 A1\* 8/2016 Kanakubo ............. G06F 3/1222

OTHER PUBLICATIONS

Gabriela Garner, "What Is Secure Printing?", available at <URL: https://www.kofax.com/learn/blog/what-is-secure-printing>, Oct. 21, 2019, 6 pages.

\* cited by examiner

*Primary Examiner* — Cheukfan Lee
(74) *Attorney, Agent, or Firm* — Kim & Stewart LLP

(57) ABSTRACT

Secure printing may be performed in a virtual desktop infrastructure (VDI) in a virtualized computing environment. When a file is selected for secure printing, print data for the file is stored, and a corresponding entry is created in a metadata map. A message is sent to a user device to inform a user that the file is available for secure printing. The message may include a uniform resource locator (URL) link having a hash code corresponding to the stored print data. If the user accesses the URL link to request the secure printing, the hash code is retrieved from the URL link and compared against the entry in the metadata map. If there is a match between the hash code and the entry in the metadata map, the file is sent to a target local printer for printing.

21 Claims, 5 Drawing Sheets

SECURE PRINTING IN A VIRTUALIZED COMPUTING ENVIRONMENT

CROSS-REFERENCE TO RELATED APPLICATION

The present application claims the benefit of Patent Cooperation Treaty (PCT) Application No. PCT/CN2023/120410, filed Sep. 21, 2023, which is incorporated herein by reference.

BACKGROUND

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a desktop to run on a VM that is provided by a hypervisor on a host server, that is typically located in a data center. A user uses the operating system (OS) and applications (which reside and execute at the VM on the host server) via an endpoint device of the user that communicates with the host server, just as if the OS/applications were actually running locally on the endpoint device.

VDI implementations provide the user with printing capability, so that the user can issue print jobs from the virtual desktop at the VM to a virtual printer, and then the printing is performed at a local printer (e.g., a physical printer) that is connected to the user's endpoint device (client device or user device). However, printing in a virtualized computing environment (such as one that is implementing VDI) is prone to security problems.

For example, the user may be away from or otherwise located distantly from the physical printer, when the physical printer completes the printing of a hardcopy of a document/file. Thus, the printed hardcopy may be exposed to viewing and/or retrieval by unauthorized persons.

DETAILED DESCRIPTION

Figure 1:
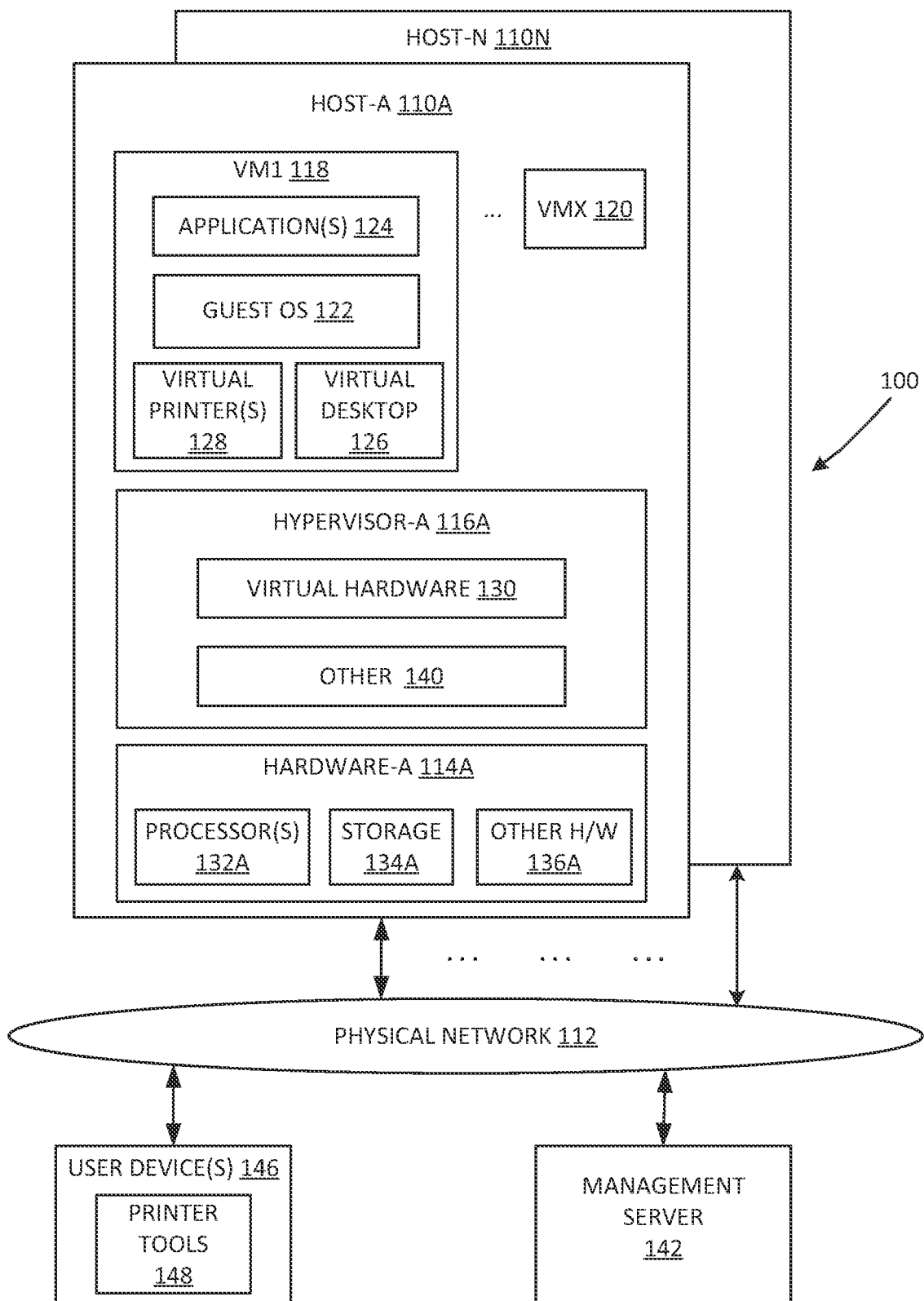
FIG. 1 is a schematic diagram illustrating an example virtualized computing environment that can provide secure printing capability.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses challenges that are encountered when attempting to perform printing in a virtualized computing environment that supports a virtual desktop infrastructure (VDI). The methods/devices/systems described herein provide secure printing capability (e.g., security printing or secure printing) that may be implemented without the need for any additional plugin hardware, and that may be implemented in situations in which a physical printer itself may not have security-related features (e.g., watermarking capability, etc.) or may be implemented in environments wherein hardcopy printouts at the physical printer may have some risks of being exposed to unauthorized persons. With the secure printing capabilities of various embodiments described herein, printing a hardcopy at a physical printer may be held until after an authorized user has arrived at the physical printer and has sent/confirmed a print request from a user device of the user. Thus, a print job may be released securely for printing and in the presence of the user.

In a VDI environment, a virtual printer at a host may be instantiated for each corresponding local printer (e.g., a physical printer) coupled to a user device (e.g., a client device). The virtual printer may be coupled to or otherwise accessible/usable by a virtual desktop at the host. When operating the virtual desktop via the user device (e.g., a first user device), the user may initiate a print request to print a document or other type of file. According to various embodiments, the virtual desktop and/or other component at the host may then request the user to confirm whether or not to apply secure printing for the file. If the user confirms that the file is to be printed using secure printing, then print data corresponding to the file is sent from the host to the first user device for storage, and the first user device also sends a hash code (corresponding to the print data) to a second user device (e.g., a mobile telephone) of the user. In some embodiments, the hash code may be sent by the first user device to the second user device via a message (e.g., a text, email, etc.) that provides a link (such as a printing uniform resource locator (URL) link), with the hash code being calculated from spooling data of the file and placed in the printing URL link.

The user may then proceed to the location of the physical printer and may operate the second user device to click on the printing URL link. Clicking on the printing URL link causes a print request to be triggered and received by the first user device. The first user device may then obtain the hash code by parsing the URL link The first user device compares the hash code received from the host with the hash code received from the second user device. If the hash codes match, then the first user device instructs the local printer to print the file from the stored print data.

Therefore, secure printing is able to be performed, in that the printing at the local printer may be held until after the user is able to go to the location of the physical printer and then clicks on the received printing URL link. Any content (e.g., confidential information) in the hardcopy printout may therefore be protected from being revealed to unauthorized persons/users.

The foregoing and other benefits of secure printing of various embodiments thus address an example scenario, such as when a human resources (HR) staff member needs to print a hardcopy of an employee's personnel record. After finalizing the file/document at the computer workstation located at the HR staff member's workspace, the HR staff member sends the file straight to a physical printer, which completes the print job by printing the hardcopy. The hardcopy is available right away—but the hardcopy may be sitting in the printer tray, possibly with several other documents recently printed by other persons in the office. During the time that it takes the HR staff member to walk from their workspace to the printer, many unauthorized employees/persons might see or even handle the sensitive content in the hardcopy printout. For example, some other person may mistakenly collect the sensitive document along with their own printed pages.

Various other features related to secure printing will be described in further detail below.

Computing Environment

To further explain the details of techniques to perform secure printing in a virtual desktop infrastructure (VDI) or other type of virtual desktop environment, reference is first made herein to FIG. 1, which is a schematic diagram illustrating an example virtualized computing environment 100 that can provide secure printing capability. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . . VMX 120, wherein X (as well as N) is an integer greater than or equal to 1. In practice, the virtualized computing environment 100 may include any number of hosts (also known as computing devices, host computers, host devices, host servers, physical servers, server systems, physical machines, etc.), wherein each host may be supporting tens or hundreds of virtual machines. For the sake of simplicity, the details of only the single VM1 118 are shown and described herein.

According to various implementations, VM1 118 may include a service, module, engine, application, or other software/code (generally referred to herein as an agent or other analogous component) to enable VM1 118 to provide and support remote desktop functionality. Thus, VM1 118 may be an example of a VDI component that includes a guest operating system (OS) 122 and one or more guest applications 124 (and their corresponding processes) that run on top of the guest OS 122, for use by one or more remote desktops. Using the guest OS 122 and/or other resources of VM1 118 and the host-A 110A, VM1 118 may generate a virtual desktop 126 (e.g., a remote desktop) that is operated by and accessible to one or more user device(s) 146 via the physical network 112. One or more virtual printers 128 may be instantiated in VM1 118 and/or elsewhere in the host-A 110A. VM1 118 may include other elements, such as code and related data (including data structures), engines, etc., which will not be explained herein in further detail, for the sake of brevity.

The user device 146 (e.g., a client device) may include printer tools 148 (explained in more detail in FIG. 2) to support print jobs at local printers that are locally connected or otherwise communicatively coupled to the user device 146. The user device 146 may be a desktop device and/or a mobile device (having an operating system, a browser or other application, and various other components to establish and conduct a remote desktop session with the virtual desktop 126, including performing printing operations). For example and according to various embodiments, the user device 146 may include a service, module, engine, application, or other software/code (generally referred to herein as a client or other analogous component) to enable the user device 146 to communicate with the agent at VM1 118 for purposes of conducting a remote desktop session with VM1 118 and/or to otherwise provide access to remote desktop functionality at VM1 118.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs. The hypervisor-A 116A and/or other components of the host-A 110A (such as VMs themselves, including virtual desktops and virtual printers, guest OSs, etc.) may include other elements (shown generally at 140), including tools to support print jobs or other type of print requests that are issued by VM1 118 to the virtual printers 128 and various other tools to provide resources for and to otherwise support the operation of the VMs. Such tools may include, for example, one or more print drivers or other printing-related components (such as a printer manager, print monitor, etc.) in some implementations.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the application(s) 124 (e.g., a word processing application, accounting software, a browser, etc.) in VM1 118. Corresponding to the hardware 114A, the virtual hardware 130 may include a virtual CPU, a virtual memory (including agent-side caches used for print jobs for the virtual printers 128), a virtual disk, a virtual network interface controller (VNIC), etc.

A management server 142 (usable by a system administrator, for example) of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster.

The management server 142 may be communicatively coupled to host-A 110A . . . host-N 110N (and hence communicatively coupled to the virtual machines, hypervisors, hardware, etc.) via the physical network 112. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Figure 2:
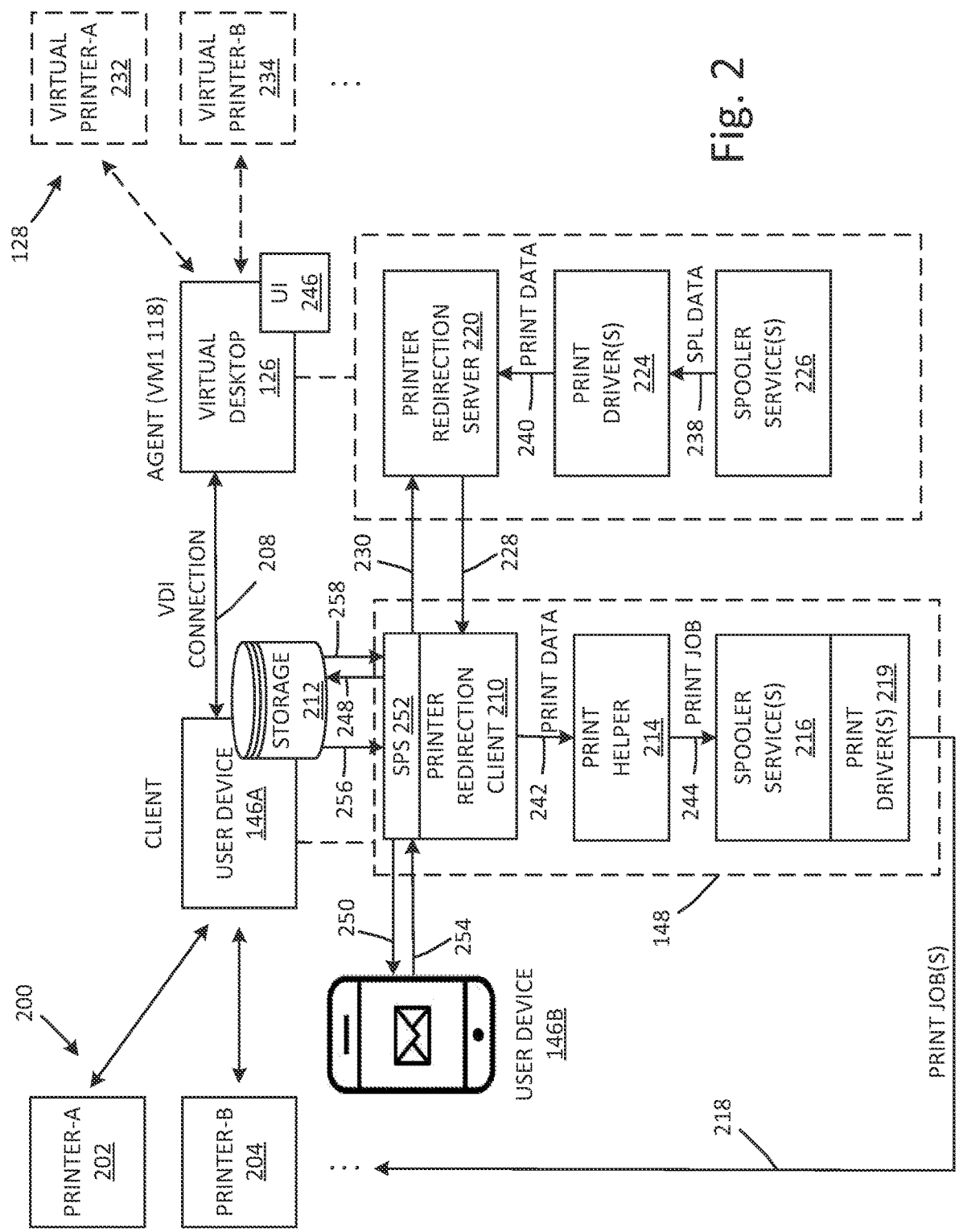
FIG. 2 is a diagram illustrating devices and printers for the virtualized computing environment of FIG. 1.

FIG. 2 is a diagram illustrating devices and printers for the virtualized computing environment 100 of FIG. 1. More specifically, FIG. 2 shows the client (e.g., at a first user device 146A), the agent (e.g., at the VM1 118 that provides the virtual desktop 126), and their associated elements and printers that execute print jobs.

The user device 146A is connected (via a network, universal serial bus (USB), or other wired/wireless connection) to a plurality of local printers 200, which may include one or more physical printers. The local printers 200 include, for instance, a printer-A 202, a printer-B 204, etc. The user device 146A accesses, operates, or otherwise communicates with the virtual desktop 126 running on VM1 118 at a host (e.g., host-A 110A), via a VDI connection 208 or other type of communication channel(s) provided by the physical network 112.

As depicted in the example of FIG. 2, the user device 146A (and its connected local printers 200) are located at a first end (or first side) of the VDI connection 208, and components of the host (e.g., the virtual desktop 126 running on VM1 118 and its corresponding agent, the virtual printers 128, etc.) are located at a second end (or second side) of the VDI connection 208. As such, the first end/side of the VDI connection 208 (where the user device and the connected local printers 200 reside) may be generally referred to as a client side, and the second end/side of the VDI connection 208 (where the components of the host reside) may be generally referred to as an agent side.

The printer tools 148 of the user device 146 may include a printer redirection client 210 that includes or is otherwise coupled to a storage 212 of the user device 146A. For example, the storage 212 may be embodied as a client cache system. The printer tools 148 may also include a print helper 214 and spooler service(s) 216 that operate in conjunction with the printer redirection client 210 and the storage 212 to prepare and send (shown at 218) print data for print jobs to the local printers 200.

The printer tools 148 may further include one or more print drivers 219. The print driver(s) 219 may operate in conjunction with or may be part of the spooler service(s) 216 in some embodiments. In various embodiments, one or more of the printer tools 148 depicted in FIG. 2 may be sub-components of an OS of the user device 146A.

Correspondingly installed at the agent side is a printer redirection server 220, a print driver 224 (such as a universal print driver (UPD) and/or other type of print driver), a print processor (not shown in FIG. 2), and spooler service(s) 226 that operate in conjunction with the printer redirection server 220 to prepare and send (shown at 228) print data to the printer redirection client 210 for printing (e.g., a hardcopy printout) at the printers 200. One or more of the printer redirection server 220, the print driver 224, the print processor, the spooler service(s) 226, and/or other printing-related components at the agent side can reside at VM1 118 or elsewhere in the host-A 110A.

In operation, when the VDI connection 208 is established between the client and the agent, information regarding the printers 200 (e.g., printing-related properties/capabilities that specify the features, functions, etc. of each of the printers 200 and/or of the documents supported by the each of the printers) may be sent (shown at 230) from the printer redirection client 210 to the printer redirection server 220 (and/or to some other component(s) at the agent side) via the VDI connection 208, which may support one or more virtual channels for communicating data (including the printing-related properties), files, streams, etc. between the client and the agent. This information is used by the printer redirection server 220 to instantiate the virtual printers 128. Thus, the virtual printers 128 include a virtual printer-A 232, a virtual printer-B 234, etc. that respectively represent the physical printer-A 202, printer-B 204, etc.

There may be a corresponding print driver 224 provided for each virtual printer-A 232, virtual printer-B 234, etc. One or more of the print driver(s) 224 may be a universal print driver (UPD).

In a general operation that does not involve secure printing, when the virtual desktop 126 issues a print job or (other type of print request to print a document or other file) for one of the virtual printers (for instance, the virtual printer-A 232), the print driver 224 gets (at 238) the print data (e.g., spooled print data such as spool system service (SPL) data) from the spooler service(s) 226 and processes/converts the print data to an appropriate format, and sends (at 240) the print data to the printer redirection server 220 so that the printer redirection server 220 can then transfer (at 228) the print data to the printer redirection client 210 at the client side. When the printer redirection client 210 receives the print data, the printer redirection client 210 sends (at 242) the print data to the print helper 214. The print helper 214 will then write or otherwise send a print job (at 244) to the spooler service(s) 216, so that the print data is sent (at 218) to the printer-A 202 for printing.

Secure Printing

Various embodiments will now be described as examples of secure printing that may be performed in the virtualized computing environment of FIG. 1, using the devices, printers, and other components of FIG. 2. In general, the printing-related operations described above with respect to FIG. 2 can be applied/used when performing secure printing, with additional devices/components and operations that will be described hereinafter that apply to secure printing.

Still referring to FIG. 2, various embodiments for secure printing may comprise one or more sub-processes of the printer redirection client 210 and the print helper 214. Furthermore, some components at the agent side, such as the printer redirection server 220, a UPD, etc. may cooperate with the spooler services 226 when performing secure printing.

In operation, when printing a document or other type of file via the virtual desktop 126 at the agent side, a user interface (UI) 246 may be presented by the virtual desktop 126. The UI 246 prompts the user with options to choose between printing directly to a target local printer (e.g., printing to one of the local printers 200 without security protection) or performing secure printing for the document. If the user chooses the secure printing option provided by the UI 246, the UI 246 (and/or some other UI) prompts (such as via a dialog box) the user to input additional information, such as an email address or mobile telephone number. In some embodiments, the selection of the secure printing option may be represented in print setting data generated at the agent side.

Next at the agent side, the print driver 224 and/or the print processor can capture (at 238) the print data (such as the print spooling data and the print setting data), process such print data, and then send (at 240) such print data to the printer redirection server 220. Processing the print data may include, for example, bitmap data compression/deduplication, font data related processing, etc. The processed print data is then sent (at 228) by the printer redirection server 220 to the printer redirection client 210.

At the client side, when the printer redirection client 210 receives the print data (including the print setting data) from the agent side, the printer redirection client 210 checks a flag in the print setting data to determine whether the current printing is to be performed as a secure printing, then decides whether to send/print the print data directly to the print helper 214 for non-secure printing, or to store (in the storage 212) the print data for later secure printing. In some embodiments, the printer redirection client 210 may include a component/sub-component, such as a secure printing service (SPS) 252, to perform operations related to secure printing.

For example and according to various embodiments, if the printer redirection client 210 determines that secure printing is to be performed, the secure printing service 252 stores (at 248) the print data as a local file into specified directory of the storage 212. The file may be named, for example, as follows: $print_id-$job_id-$date-$time, such that the date and time of being placed into the storage 212 forms part of the file name. When storage of the print data is finished, the secure printing service 252 of some embodiments generates/calculates a hash code (e.g., using md5 or SHA512 or other hashing technique) corresponding to the print data.

The hash code may then be used in some embodiments as a part of secure printing uniform resource locator (URL) link generated by the secure printing service 252. The secure printing service 252 then sends (at 250) the printing URL link to a second user device 146B of the user. The user device 146B may be, for example, a mobile telephone of the user, and the printing URL link may be received (at 250) via an email, a text message, or other message/notification format.

The format of the printing ULR link may be, for example, the following in which the hash code is integrated into or otherwise forms part of the URL link:
https:\\printserver_hostname\print?hash code Various embodiments are described above and hereinafter in the context of the message (including the printing URL link) being sent to the user device 146B, which is a separate/second user device relative to the first user 146A, and then the URL link being operated upon from the second user device 146B. In some other embodiments, the message (including the printing URL link) can be sent additionally or alternatively to and operated upon by other user devices, including the first user device 146A or some other user device(s).

According to various embodiments, the secure printing service 252 also generates a relationship between the printing URL link and the print data, and stores (in the storage 212) this relationship as metadata about the print data. The metadata may be stored in the storage 212 as a map structure such as a key-value pair: <Key, Value>, wherein the key is the hash code, and the value is the location in the storage 212 of the print data.

In response to receiving the message having the printing URL link at the user device 146B, the user may go/transit to the physical location of the target local printer with the user device 146B, so as to be present there when the document is printed. To continue the printing process for the document, the user may operate the user device 146B to access the printing URL from the received message, and may then confirm the secure printing by operating the user device 146B to send (at 254) a print request (e.g., a secure printing request) to the secure printing service 252. This print request may be sent, for example, when the user clicks on the printing URL link via the user device 146B.

When the secure printing service 252 receives the print request from the user device 146B, the secure printing service 252 obtains the hash code from the printing URL link, compares (at 256) that hash code to the metadata map structure, and loads/reads (at 258) the print data from the storage 212 if the hash code is verified. The secure printing service 252 sends (at 242) the print data to the print helper 242, and then the hardcopy of the document is printed out from target local printer in the manner previously described above.

Further details regarding the foregoing features/operations of secure printing will be described next.

Figure 3:
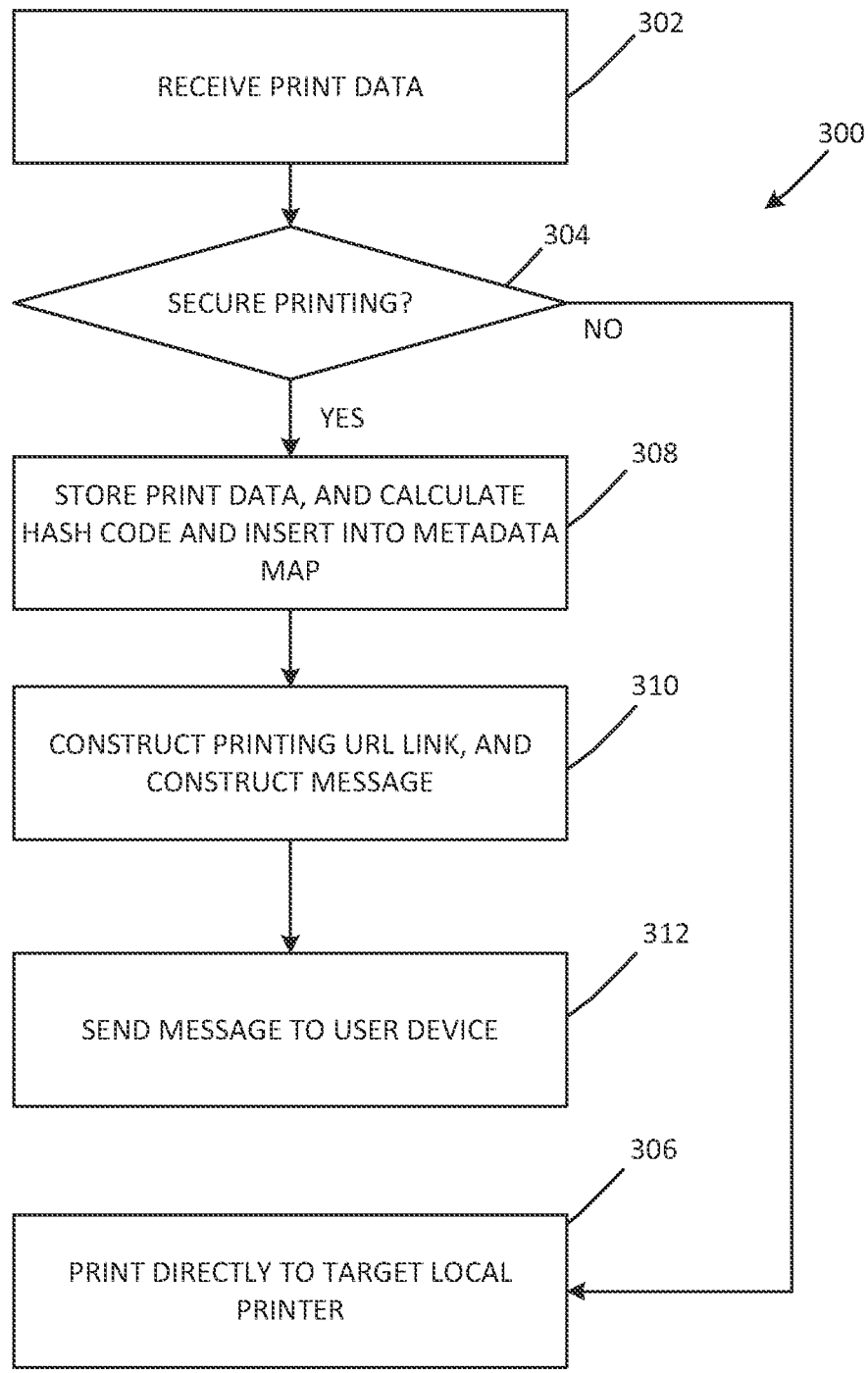
FIG. 3 is a flowchart of an example method to perform secure printing in the virtualized computing environment of FIG. 1.

FIG. 3 is a flowchart of an example method 300 to perform secure printing in the virtualized computing environment of 100 of FIG. 1. The example method 300 may include one or more operations, functions, or actions illustrated by one or more blocks, such as blocks 302 to 312. The various blocks of the method 300 and/or of any other process(es) described herein may be combined into fewer blocks, divided into additional blocks, supplemented with further blocks, and/or eliminated based upon the desired implementation. In one embodiment, the operations of the method 300 and/or of any other process(es) described herein may be performed in a pipelined sequential manner. In other embodiments, some operations may be performed out-of-order, in parallel, etc.

According to one embodiment, the method 300 may be performed by the client-side components of one or more user devices such shown in FIGS. 1 and 2, in cooperation with the agent-side components at a host (e.g., the virtual desktop 126 and its printing-related components shown in FIGS. 1 and 2). In other embodiments, various other elements in a computing environment may perform, individually or cooperatively, the various operations of the method 300. The various operations of the method 300 (and/or other methods disclosed herein) will be described in the context of some of the components shown in FIGS. 1 and 2 performing the operations.

At a block 302 ("RECEIVE PRINT DATA"), the user device 146A receives the print data from the host (e.g., from the agent side). For example, the user is using the virtual desktop 126, and has initiated a printing request to print a document or other type of file/content. The agent-side components prepare the corresponding print data for printing and prompts (e.g., via the UI 246) the user to specify whether secure printing is desired, and sends the print data to the printer redirection client 210 at the client side.

The block 302 may be followed by a block 304 ("SECURE PRINTING?"), wherein the printer redirection client 210 checks the print setting data (which may be included with the print data) to determine if a flag or other indication for secure printing has been set. If the printer redirection client 210 determines that secure printing is not to be performed ("NO" at the block 304), then the printer redirection client 210 sends the print data to the print helper 214, the spooler service 216, etc. for printing directly at the designated target local printer (e.g., one of the physical printers 200), at a block 306 ("PRINT DIRECTLY TO TARGET LOCAL PRINTER").

However, if the printer redirection client 210 determines that secure printing is to be performed ("YES" at the block 304), then the printer redirection client 210 stores the print data in the storage 212 as a local file, calculates the hash code, and inserts the hash code into the metadata map, at a block 308 ("STORE PRINT DATA, AND CALCULATE HASH CODE AND INSERT INTO METADATA MAP"). As previously explained above, the hash code may be stored as part of a key value pair <hash code, storage path> into the metadata map.

The block 308 may be followed by a block 310 ("CONSTRUCT PRINTING URL LINK, AND CONSTRUCT MESSAGE"), wherein the secure printing service 252 and/or some other component of the printer redirection client 210 constructs the printing URL link that includes or is otherwise based upon the hash code, and constructs a message (e.g., an email, etc.) that provides or is otherwise based upon the printing URL link.

The block 310 may be followed by a block 312 ("SEND MESSAGE TO USER DEVICE"), wherein the secure printing service 252 and/or some other component of the printer redirection client 210 sends the message (which includes the printing URL link) to at least one user device. As previously described above, such user device(s) may be the second user device 146B (e.g., a mobile telephone), the first user device 146A, and/or some other user device(s).

Figure 4:
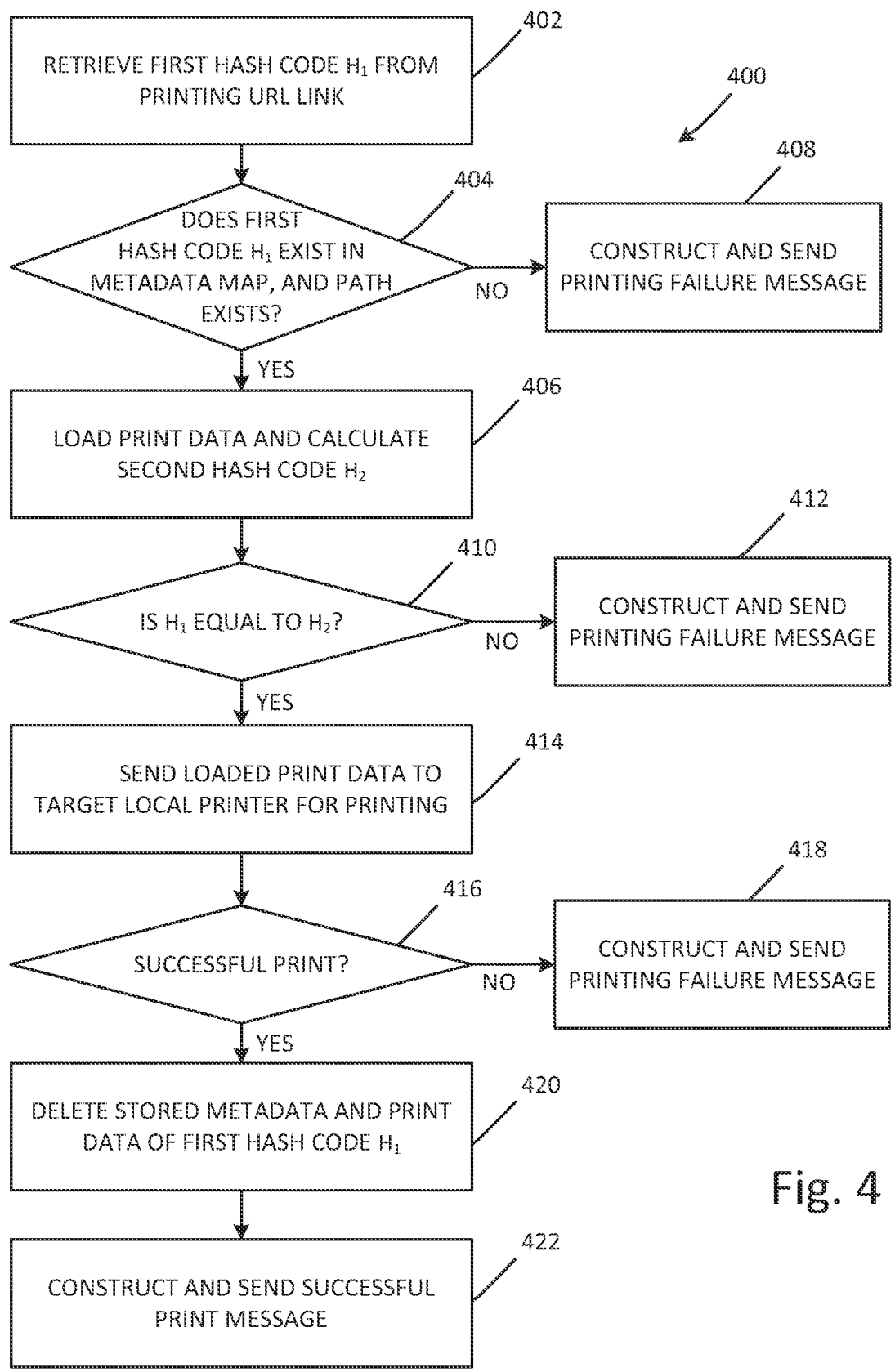
FIG. 4 is another flowchart of an example method to perform secure printing in the virtualized computing environment of FIG. 1.

FIG. 4 is another flowchart of an example method 400 to perform secure printing in the virtualized computing environment 100 of FIG. 1. More specifically, FIG. 4 illustrates the method 400 that may be performed by the secure printing service 252, in response to the user having accessed (e.g., clicked on) the printing URL link that was sent to the user device 146B at the block 312 of FIG. 3. By clicking on the printing URL link, a secure print request is sent from the user device 146B to the secure printing service 252. The printing URL link of various embodiments may include the hash code in it.

At a block 402 ("RETRIEVE FIRST HASH CODE H1 FROM PRINTING URL LINK"), the secure printing service 252 receives the print request and obtains the hash code from the printing URL link. Specifically, the secure printing service 252 of some embodiments may parse the URL link to retrieve the hash code (a first hash code H1) contained in the printing URL link.

The block 402 may be followed by a block 404 ("DOES FIRST HASH CODE H1 EXIST IN METADATA MAP, AND PATH EXISTS?"), wherein the secure printing service 252 checks whether the first hash code H1 exists in the metadata map $M_{metadata}$, for example by comparing the first hash code H1 against entries in the metadata map $M_{metadata}$. If the first hash code H1 exists in the metadata map $M_{metadata}$ and if the value of the path location of the stored print data also exists ("YES" at the block 404), then the secure printing service 252 loads the stored print data from the storage 212 into memory, at a block 406 ("LOAD PRINT DATA AND CALCULATE SECOND HASH CODE H2"). At the block 406, the secure printing service 252 also calculates a second hash code H2 from the loaded print data. This second hash code H2 is used later to verify the integrity of the print data loaded from the storage 212.

If, back at the block 404, the secure printing service 252 determines that the first hash code H1 does not exist in the metadata map $M_{metadata}$ or if the value of the path location of the stored print data does not exist ("NO" at the block 404), then the secure printing service 252 constructs and sends a printing failure message, at a block 408 ("CONSTRUCT AND SEND PRINTING FAILURE MESSAGE"). For example, a response/message notifying the user of any failure to print may be sent back to the requestor (e.g. a browser) of the user device 146B. The failure message may be sent, for instance, if the print request message sent by the user device 146B at the block 312 in FIG. 3 contains invalid content.

The block 406 may be followed by a block 410 ("IS H1 EQUAL TO H2?"), wherein the secure printing service 252 checks whether the first hash code H1 obtained from the printing URL link at the block 402 is equal to the second hash code H2 calculated at the block 406. For example, the checking at the block 410 may be performed to verify that the print data loaded from the storage 212 is intact (e.g., not damaged, modified, corrupted, etc.). The presence of matching hash codes ("YES" at the block 410) confirms the integrity of the print data, whereas mismatched hash codes ("NO" at the block 410) indicates that the print data is not intact. In such a mismatched situation, the secure printing service 252 constructs and sends a printing failure message, at a block 412 ("CONSTRUCT AND SEND PRINTING FAILURE MESSAGE"), to notify the user that printing has failed due to something being wrong with the print data.

The block 410 may be followed by a block 414 ("SEND LOADED PRINT DATA TO TARGET LOCAL PRINTER FOR PRINTING"), wherein the secure printing service 252 sends (via the print helper 214, the spooler service 216, and the print driver 219) the loaded print data to the target local printer for printing. The block 414 may be followed by a block 416 ("SUCCESSFUL PRINT?"), wherein the secure printing service 252 determines whether the target local printer was able to successfully complete the printing.

If printing failed ("NO" at the block 416), then the secure printing service 252 constructs and sends a printing failure message, at a block 418 ("CONSTRUCT AND SEND PRINTING FAILURE MESSAGE"), to notify the user that printing has failed. For example, the target local printer may be offline or out of paper, or printing may have failed for some other reason. The secure printing service 252 may prompt the user to try printing again.

If printing is successfully completed at the target local printer ("YES" at the block 416), then the secure printing service 252 removes the corresponding record (e.g., the key-value pair) from the metadata map $M_{metadata}$ and also removes the stored print data (corresponding to the first hash code H1) from the storage 212, at a block 420 ("DELETE STORED METADATA AND PRINT DATA OF FIRST HASH CODE H1").

The block 420 may be followed by a block 422 ("CONSTRUCT AND SEND SUCCESSFUL PRINT MESSAGE"), wherein the secure printing service 252 constructs and sends a message to the user device 146B and/or to other user device(s), so as to confirm to the user that the document has been successfully printed at the target local printer.

Figure 5:
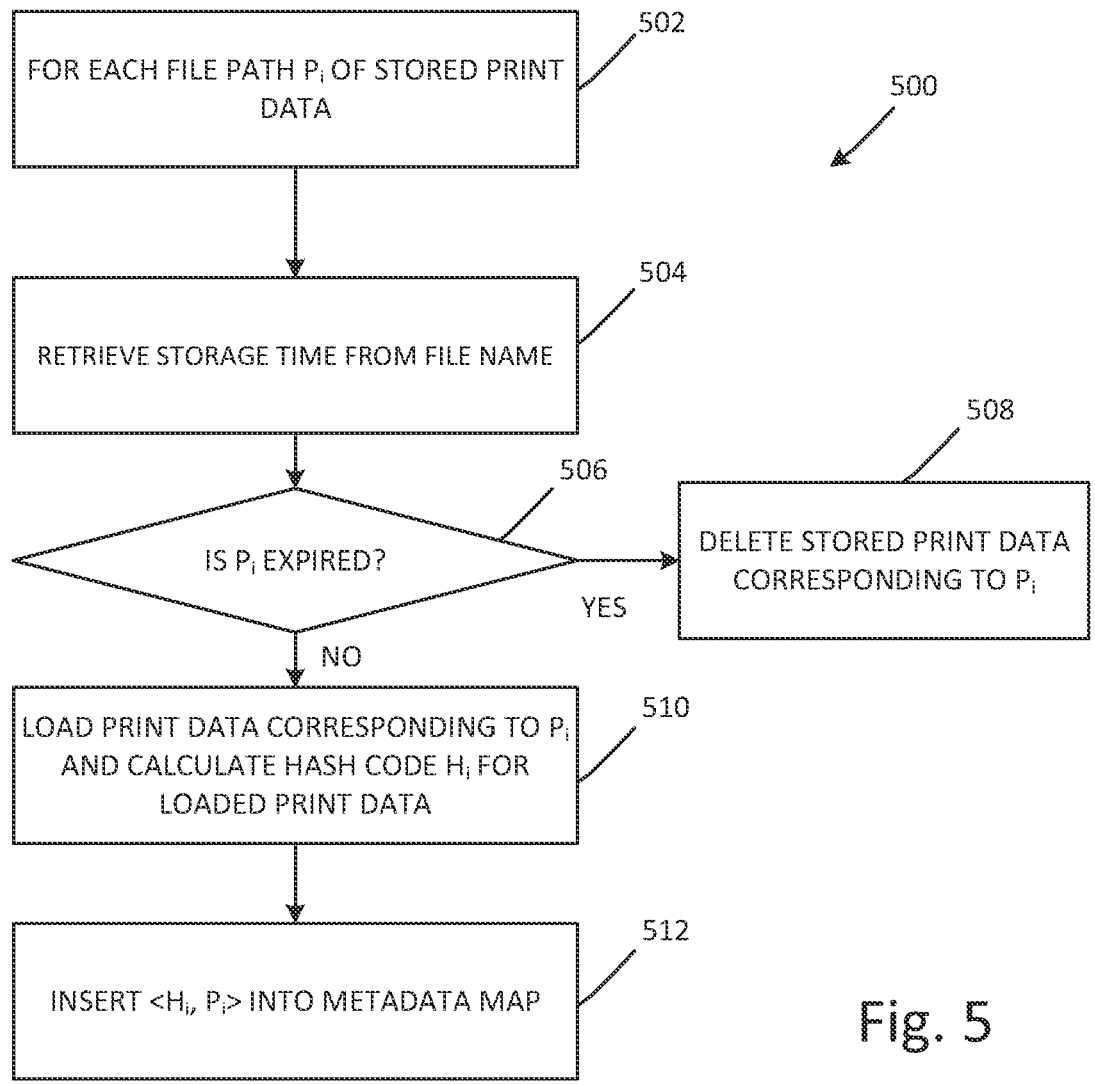
FIG. 5 is still another flowchart of an example method to perform secure printing in the virtualized computing environment of FIG. 1.

FIG. 5 is still another flowchart of an example method 500 to perform secure printing in the virtualized computing environment 100 of FIG. 1. More specifically, the method 500 may be performed by the secure printing service 252 to manage secure printing-related data, such as verifying that print data stored in the storage 212 has not expired.

According to various embodiments, secure printing-related data (e.g., print data, metadata, etc.) may be managed by the secure printing service 252, such that the method 500 may be invoked at the beginning of a VDI session, or may be run every 12 hours or other timeframe.

At a block 502 ("FOR EACH FILE PATH $P_i$ OF STORED PRINT DATA"), the secure printing service 252, when it starts, tries to traverse each file path $P_i$ of the print data stored in the storage 212, one by one. The block 502 may be followed by a block 504 ("RETRIEVE STORAGE TIME FROM FILE NAME"), wherein the secure printing service 252 determines the amount of storage time that the print data in the path $P_i$ has been stored in the storage 212. The amount of storage time may be determined, for example, by retrieving the amount of storage time (e.g., which may be based upon the create date/time) from the file name or other file properties information.

At 506 ("IS $P_i$ EXPIRED?"), the secure printing service 252 determines (from the storage time) if the file (e.g., the print data) in the path $P_i$ has expired. If the stored print data in the path $P_i$ has expired ("YES" at the block 506), then the secure printing service 252 deletes the stored print data in the path $P_i$ from the storage 212, at a block 508 ("DELETE STORED PRINT DATA CORRESPONDING TO $P_i$"). Print data may be deemed to have expired, for example, if the print data has been stored for three days or other threshold amount of time without having been loaded for printing.

If, back at the block 506, the secure printing service 252 determines that the stored printing data is not expired ("NO" at the block 506), then the secure printing service 252 loads the print data (in the file in the path $P_i$) from the storage 212, and calculates the hash code $H_i$ for the loaded print data, at a block 510 ("LOAD PRINT DATA CORRESPONDING TO $P_i$ AND CALCULATE HASH CODE $H_i$ FOR LOADED PRINT DATA").

The block 510 may be followed by a block 512 ("INSERT <$H_i$, $P_i$> INTO METADATA MAP"), wherein the secure printing service 252 then inserts the key-value pair <hash code, path> into the metadata map $M_{metadata}$. The process described above for the method 500 is then repeated by the secure printing service 252 for the next/each path $P_i$.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-5. For example, computing devices capable of acting as agent-side devices/components or client-side user devices/components may be deployed in or otherwise operate in conjunction with the virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances (VCIs) may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to improve the security when printing documents or other types of files.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

The invention claimed is:

1. A method to perform secure printing in a virtualized computing environment that includes a host device, the method comprising:
    receiving, from the host device, print data of a file;
    determining whether secure printing is to be applied to the print data;
    in response to determination that the secure printing is to be applied to the print data, sending a message to a user device to notify a user of the user device that the print data is available for the secure printing;
    in response to receiving a print request from the user device to securely print the print data, comparing a hash code in the message to an entry in a metadata map; and
    in response to the hash code matching the entry in the metadata map, performing the secure printing of the print data at a printer.

2. The method of claim 1, wherein the print data is received by a first user device from the host device, and wherein sending the message to the user device comprises sending the message to a second user device.

3. The method of claim 1, wherein sending the message to the user device includes sending a uniform resource locator (URL) link having the hash code to the user device.

4. The method of claim 1, further comprising storing the received print data in a storage, wherein the entry in the metadata map comprises a key-value pair, wherein the hash code is the key, and wherein a path, in the storage where the print data is located, is the value.

5. The method of claim 1, wherein the hash code is a first hash code, and wherein the method further comprises:
    calculating a second hash code for the print data; and
    comparing the first hash code to the second hash code,
    wherein performing the secure printing of the print data is performed in response to the first hash code matching the second hash code.

6. The method of claim 1, further comprising:
    in response to determination that the secure printing is inapplicable to the print data, sending the print data to the printer for printing directly.

7. The method of claim 1, further comprising:
    storing multiple print data, received from the host device, in a storage, wherein multiple paths respectively correspond to locations in the storage where the multiple print data are stored;
    determining a storage time for the print data in each of the multiple paths;
    deleting any print data having a storage time that exceeds an expiration threshold; and
    calculating the hash code for any print data having a storage time that is less than the expiration threshold, and placing the hash code and corresponding path of the print data into the metadata map.

8. A non-transitory computer-readable medium having instructions stored thereon, which in response to execution by one or more processors, cause the one or more processors to perform a method to perform secure printing in a virtualized computing environment that includes a host device, wherein the method comprises:
    receiving, from the host device, print data of a file;
    determining whether secure printing is to be applied to the print data;
    in response to determination that the secure printing is to be applied to the print data, sending a message to a user device to notify a user of the user device that the print data is available for the secure printing;
    in response to receiving a print request from the user device to securely print the print data, comparing a hash code in the message to an entry in a metadata map; and
    in response to the hash code matching the entry in the metadata map, performing the secure printing of the print data at a printer.

9. The non-transitory computer-readable medium of claim 8, wherein the print data is received by a first user device from the host device, and wherein sending the message to the user device comprises sending the message to a second user device.

10. The non-transitory computer-readable medium of claim 8, wherein sending the message to the user device includes sending a uniform resource locator (URL) link having the hash code to the user device.

11. The non-transitory computer-readable medium of claim 8, wherein the method further comprises:
    storing the received print data in a storage, wherein the entry in the metadata map comprises a key-value pair, wherein the hash code is the key, and wherein a path, in the storage where the print data is located, is the value.

12. The non-transitory computer-readable medium of claim 8, wherein the hash code is a first hash code, and wherein the method further comprises:
    calculating a second hash code for the print data; and
    comparing the first hash code to the second hash code,
    wherein performing the secure printing of the print data is performed in response to the first hash code matching the second hash code.

13. The non-transitory computer-readable medium of claim 8, wherein the method further comprises:
    in response to determination that the secure printing is inapplicable to the print data, sending the print data to the printer for printing directly.

14. The non-transitory computer-readable medium of claim 8, wherein the method further comprises:
    storing multiple print data, received from the host device, in a storage, wherein multiple paths respectively correspond to locations in the storage where the multiple print data are stored;
    determining a storage time for the print data in each of the multiple paths;
    deleting any print data having a storage time that exceeds an expiration threshold; and
    calculating the hash code for any print data having a storage time that is less than the expiration threshold, and placing the hash code and corresponding path of the print data into the metadata map.

15. A computing device to perform secure printing in a virtualized computing environment that includes a host device, the computing device comprising:
    one or more processors; and a non-transitory computer-readable medium having instructions stored thereon, which in response to execution by the one or more processors, cause the one or more processors to perform operations that include:
receive, from the host device, print data of a file;
determine whether secure printing is to be applied to the print data;
in response to determination that the secure printing is to be applied to the print data, send a message to a user device to notify a user of the user device that the print data is available for the secure printing;
in response to receiving a print request from the user device to securely print the print data, compare a hash code in the message to an entry in a metadata map; and
in response to the hash code matching the entry in the metadata map, perform the secure printing of the print data at a printer.

16. The computing device of claim 15, wherein the print data is received by a first user device from the host device, and wherein the operations to send the message to the user device include operations to send the message to a second user device.

17. The computing device of claim 15, wherein the operations to send the message to the user device includes operations to send a uniform resource locator (URL) link having the hash code to the user device.

18. The computing device of claim 15, wherein the operations further include:
store the received print data in a storage, wherein the entry in the metadata map comprises a key-value pair, wherein the hash code is the key, and wherein a path, in the storage where the print data is located, is the value.

19. The computing device of claim 15, wherein the operations to receive the printing-related properties for the local printer comprise operations to:
receive, by the simulator, one or more extensible markup language (XML) files that describe the printing-related properties.

20. The computing device of claim 15, wherein the hash code is a first hash code, and wherein the operations further include:
calculate a second hash code for the print data; and
compare the first hash code to the second hash code,
wherein the secure printing of the print data is performed in response to the first hash code matching the second hash code.

21. The computing device of claim 15, wherein the operations further include:
store multiple print data, received from the host device, in a storage, wherein multiple paths respectively correspond to locations in the storage where the multiple print data are stored;
determine a storage time for the print data in each of the multiple paths;
delete any print data having a storage time that exceeds an expiration threshold; and
calculate the hash code for any print data having a storage time that is less than the expiration threshold, and place the hash code and corresponding path of the print data into the metadata map.

* * * * *